(12) United States Patent
Khoreva et al.

(10) Patent No.: US 12,266,161 B2
(45) Date of Patent: Apr. 1, 2025

(54) DEVICE AND METHOD FOR TRAINING A MACHINE LEARNING SYSTEM FOR GENERATING IMAGES

(71) Applicant: Robert Bosch GmbH, Stuttgart (DE)

(72) Inventors: Anna Khoreva, Stuttgart (DE); Vadim Sushko, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 582 days.

(21) Appl. No.: 17/649,481

(22) Filed: Jan. 31, 2022

(65) Prior Publication Data
US 2022/0262106 A1     Aug. 18, 2022

(30) Foreign Application Priority Data

Feb. 18, 2021   (EP) .................................... 21157926

(51) Int. Cl.
| | |
|---|---|
| *G06V 10/82* | (2022.01) |
| *G06N 3/045* | (2023.01) |
| *G06N 3/08* | (2023.01) |
| *G06V 10/764* | (2022.01) |

(52) U.S. Cl.
CPC ............. *G06V 10/82* (2022.01); *G06N 3/045* (2023.01); *G06N 3/08* (2013.01); *G06V 10/764* (2022.01)

(58) Field of Classification Search
CPC .... G06V 10/82; G06V 10/764; G06V 10/454; G06V 10/774; G06V 10/7747; G06V 10/7753; G06V 10/776; G06N 3/045; G06N 3/08; G06N 3/047; G06N 3/088; G06N 3/084; G06N 20/00; G06N 3/0475; G06N 3/082; G06N 3/048; G06N 3/094; G06T 2207/20081; G06T 2207/20084; G06T 11/60; G06T 3/4046; G06T 3/4053; G06T 5/50; G06T 7/11; G06F 18/214; G06F 18/2413; G06F 18/2148

See application file for complete search history.

(56) References Cited

U.S. PATENT DOCUMENTS

| | | | | |
|---|---|---|---|---|
| 10,592,779 | B2 * | 3/2020 | Madani | G06F 18/24 |
| 11,900,534 | B2 * | 2/2024 | Afrasiabi | G06N 3/088 |
| 11,935,243 | B2 * | 3/2024 | Hofmann | G06V 20/70 |
| 2018/0204336 | A1 * | 7/2018 | Fang | G06T 7/40 |
| 2019/0130278 | A1 * | 5/2019 | Karras | G06V 10/82 |
| 2019/0251721 | A1 * | 8/2019 | Hua | G06N 3/088 |
| 2019/0286950 | A1 * | 9/2019 | Kiapour | G06F 16/532 |

(Continued)

OTHER PUBLICATIONS

Yang et al., "Diversity-Sensitive Conditional Generative Adversarial Networks," Cornell University, 2019, pp. 1-23.

(Continued)

*Primary Examiner* — Michael S Osinski
(74) *Attorney, Agent, or Firm* — NORTON ROSE FULBRIGHT US LLP; Gerard A. Messina

(57) ABSTRACT

A computer-implemented method for training a generative adversarial network. A generator of the generative adversarial network is configured to generate at least one image based on at least one input value. Training the generative adversarial network includes maximizing a loss function that characterizes a difference between a first image determined by the generator for at least one first input value and a third image determined by the generator for at least one second input value.

14 Claims, 7 Drawing Sheets

(56) References Cited

U.S. PATENT DOCUMENTS

| | | | | |
|---|---|---|---|---|
| 2020/0151938 | A1* | 5/2020 | Shechtman | G06N 3/045 |
| 2020/0242736 | A1* | 7/2020 | Liu | G06T 11/60 |
| 2021/0089903 | A1* | 3/2021 | Murray | G06F 18/2132 |
| 2021/0224607 | A1* | 7/2021 | Deng | G06N 3/045 |
| 2021/0264568 | A1* | 8/2021 | Shi | G06T 3/4053 |
| 2021/0303925 | A1* | 9/2021 | Hofmann | G06V 20/10 |
| 2022/0076075 | A1* | 3/2022 | Madani | G06F 18/2155 |
| 2022/0124257 | A1* | 4/2022 | Zhao | G06N 3/08 |
| 2022/0148241 | A1* | 5/2022 | Park | G06T 5/60 |
| 2022/0180190 | A1* | 6/2022 | Verma | G06N 3/047 |
| 2022/0180490 | A1* | 6/2022 | Jo | G06N 3/088 |
| 2022/0188978 | A1* | 6/2022 | Hu | G06T 11/008 |
| 2022/0215504 | A1* | 7/2022 | Moens | G06N 3/047 |
| 2022/0222532 | A1* | 7/2022 | Shu | G06T 5/40 |
| 2022/0301106 | A1* | 9/2022 | Liu | G06T 3/4076 |
| 2022/0327358 | A1* | 10/2022 | Huh | G06N 3/045 |
| 2022/0335689 | A1* | 10/2022 | Zhu | G06T 7/0004 |
| 2022/0374630 | A1* | 11/2022 | Huang | G06F 18/214 |
| 2023/0021338 | A1* | 1/2023 | Ahuja | G06N 3/0475 |
| 2023/0094192 | A1* | 3/2023 | Su | G06V 20/41 |
| | | | | 382/103 |
| 2023/0215083 | A1* | 7/2023 | Hoffman-John | G06T 15/50 |
| | | | | 345/419 |
| 2024/0160937 | A1* | 5/2024 | Zhang | G06N 3/047 |

OTHER PUBLICATIONS

Bolluyt et al., "Collapse Resistant Deep Convolutional Gan for Multi-Object Image Generation," 2019 18TH IEEE International Conference on Machine Learning and Applications (ICMLA), 2019, pp. 1404-1408.

* cited by examiner

DEVICE AND METHOD FOR TRAINING A MACHINE LEARNING SYSTEM FOR GENERATING IMAGES

CROSS REFERENCE

The present application claims the benefit under 35 U.S.C. § 119 of European Patent Application EP 21 15 7926.3 filed on Feb. 18, 2021, which is expressly incorporated herein by reference in its entirety.

FIELD

The present invention concerns a method training a generative adversarial network, a device for executing the method for training, a generative adversarial network, a computer program and a machine-readable storage medium.

BACKGROUND INFORMATION

Yang et al. "Diversity-sensitive conditional generative adversarial networks," in International Conference on Learning Representations (ICLR), 2019 describes a method for training a generative adversarial networks.

SUMMARY

Modern image classifiers, especially those based on neural networks, require a substantial amount of images both for training and for testing. An image classifier's performance, i.e., classification accuracy, generally increases with an increasing amount of training images, given that the new images show diverse content. Likewise, more test data increases a confidence of correctly predicting the generalization performance of the image classifier, i.e., its ability to correctly classify new and/or unseen data.

Obtaining an increasing amount of training images, however, is generally a time consuming and costly endeavor as one has to record images in the real world. It is much more convenient, starting at a small training dataset of recorded images, to synthetically generate images and augment the training dataset with the generated images. However, when using small training datasets (in the extreme consisting of only a single image), conventional image generation methods overfit to the training data which results in the generated images not being diverse. As a consequence, the generated images do neither enable a better performance when used for training an image classifier nor do they support in approximating the generalization capabilities of the image classifier when used for testing.

An advantage of a method in accordance with an example embodiment of the present invention is that the method is able to train a machine learning system for generating images, wherein the machine learning system may be trained with a single image only and is still able to avoid overfitting to said image. After training, the machine learning system is able to generate diverse and realistic-looking images, which enable an enhanced performance of an image classifier when used for training or a better approximation of the generalization capabilities of the image classifier when used for testing.

In a first aspect, the present invention is concerned with a computer-implemented method for training a generative adversarial network, wherein a generator of the generative adversarial network is configured to generate at least one image based on at least one input value. In accordance with an example embodiment of the present invention, training the generative adversarial network comprises maximizing a loss function that characterizes a difference between a first image determined by the generator for at least one first input value and a third image determined by the generator for at least one second input value.

An image may be obtained from an optical sensor, e.g., a camera sensor, a LIDAR sensor, a radar sensor, an ultrasound sensor or a thermal camera. An image may also be a combination of multiple images, e.g., a combination of images obtained from multiple sensors of the same or obtained from different types of sensors. Preferably, images are stored as tensors, wherein an image is an at least three-dimensional tensor with a first dimension characterizing a height of the image, a second dimension characterizing a width of the image and a third dimension characterizing at least one channel of the image. For example, RGB images comprise three channels, one for each color. If an image comprises multiple images, they may preferably be stacked along the channel dimension. For example, stacking two RGB images in a single image may result in a tensor comprising six channels.

The generative adversarial network (GAN) may be understood as a machine learning system. The method for training may hence be understood as an improved method to train a GAN. After training, the generator may then be used to generate images. Preferably, these generated images may then be further used to train a second machine learning system, e.g., a neural network such as a convolutional neural network, and/or to test the second machine learning system. This advantageously allows the second machine learning system to be trained with more images, which improves the performance of the second machine learning system, and/or to be tested with more images, which allows for better assessing the generalization capabilities of the second machine learning system.

In accordance with an example embodiment of the present invention, preferably, the generator generates an image based on a plurality of randomly drawn input values, e.g., a vector of randomly drawn input values, preferably from a multivariate Gaussian distribution.

Training a GAN to minimize the loss function described above generally circumvents a problem known as modecollapse (see Yang et al.). However, in accordance with an example embodiment of the present invention, it may be beneficial to maximize the loss function from above, especially in situations, where only small amounts of training data are available, in the extreme, where only one image is available for training. An advantage of maximizing the loss function is that the images generated by the GAN exhibit a larger diversity compared to training the GAN without maximizing the loss function. If a second machine learning system is trained with these images, it allows the second machine learning system to be trained on more and especially diverse data, which enhances the prediction performance (classification accuracy and/or regression accuracy) of the second machine learning system.

In accordance with an example embodiment of the present invention, in the method, the generator is preferably a neural network comprising a plurality of neural network blocks.

A neural network may be understood as comprising a plurality of layers. These layers may, by certain design decisions, be grouped into neural network blocks or simply blocks. In general, blocks may be seen as parts of a neural network that are defined by some form of architectural choice of the neural network.

A preferred way of defining blocks is by means of a so-called skip connection. A conventional example for these types of blocks are residual blocks. In a residual block, a plurality of layers may be bypassed by a skip connection. Other conventional neural network blocks comprising skip connections are dense blocks or dense-shortcut blocks.

Blocks of a neural network may accept an input, which may then be processed by the block, wherein a result of the processing may then be forwarded to another block or be used as at least part of an output of the neural network. The blocks may hence be seen as a chain concatenated in a feedforward fashion.

Preferably, the loss function is applied to outputs of the generator after different blocks, preferably all the blocks. The inventors found that this allows the generator to generator more realistic looking images due to the fact that the loss functions is applied to different scales of the neural network output. While blocks earlier in the chain may rather provide output features for smaller scales of the image to be generated, the layers later in the chain have a larger receptive field and are hence capable of determining features at larger scales. Applying the loss function after each block hence improves the performance of the generative adversarial network.

Preferably, the loss function is characterized by the formula:

$$\mathcal{L}_{DR}(G) = \frac{1}{L}\sum_{l=1}^{L}\|G^l(z_1) - G^l(z_2)\|,$$

wherein $G^l(\cdot)$ is the output of the l-th block of the generator, $z_1$ is the at least one first input value $z_2$ is the at least one second input value and L is the amount of blocks after which the loss function shall be applied.

Preferably, the loss function is applied after each block of the generator.

In further embodiments of the method, the method for training may further comprise the steps of:
Generating, by the generator, a first image based on at least one randomly drawn value;
Determining, by a discriminator of the machine learning system, a first output characterizing two classifications of the first image and determining, by the discriminator, a second output characterizing two classifications of a provided second image, wherein the discriminator is configured to determine an output for a supplied image according to the following steps:
Determining an intermediate representation of the supplied image;
Determining a content representation of the supplied image by applying a global pooling operation to the intermediate representation;
Determining a layout representation of the supplied image by applying a convolutional operation to the intermediate representation;
Determining a content value characterizing a classification of the content representation and a layout value characterizing a classification of the layout representation and providing the content value and layout value in the output for the supplied image;
Training the discriminator such that the content value and layout value in the first output characterize a classification into a first class and such that the content value and layout value in the second output characterize a classification into a second class;
Training the generator such that the content value and layout value in the first output characterize a classification into the second class.

This example embodiment of the present invention may be understood as training the machine learning system to learn the characteristics of the second image with respect to content and layout such that it is able to generate new images that are similar in content and/or layout as the second image, i.e., able to generate a diverse set of images similar to the second image.

The machine learning system may also be trained with multiple second images in order to learn the characteristics of the multiple second images.

The example embodiment of the present invention may further be understood as a zero-sum game. While the generator is trained to generate images that fool the discriminator, the discriminator is trained to discern whether an image supplied to the discriminator an image has been generated by the generator or not. In the common nomenclature of GANs, the first class may be understood as class of fake images, i.e., generated images and the second class may be understood as class of real images.

The features of the discriminator may be understood as imposing additional constraints on the generator in a sense that the discriminator is harder to fool to classify a generated image as belonging to the second class. This is due to the fact that the discriminator is trained to judge both the content as well as the layout of an image before classifying it into one of the two classes. The inventors found out that this enables the generator to generate images that look even more like the at least one second image. Most notably, the inventors found that the provided method is able to train the machine learning system based on a single image only without overfitting to the single image. The method may hence advantageously be used for training the machine learning system on a small dataset of second images.

As another effect, the performance of the second machine learning system is improved and/or its generalization capabilities better approximated as the generator is capable to generate more-realistic looking images.

Preferably, the generator and the discriminator each comprise a neural network, especially a convolutional neural network. The discriminator may be understood as comprising two branches, one for predicting a classification based on the content of a provided image into either the first or the second class and another for predicting a classification based on the layout of the provided image into either the first or the second class. Both branches base their classification on an intermediate representation that is obtained from the provided image.

Preferably, the discriminator is configured to determine the intermediate representation of the provided image by forwarding the provided image through a first plurality of layers which then determines the intermediate representation. Preferably, the first plurality of layers is organized as residual blocks. The first plurality of layers may especially be configured such that the intermediate representation comprises a plurality of feature maps.

Based on the intermediate representation, the discriminator determines the content representation by applying a global pooling operation to the intermediate representation. The global pooling operation may, for example, be a global average pooling operation, a global max-pooling operation or a global stochastic pooling operation. The global pooling operation may be characterized by a global pooling layer comprised by the discriminator. The global pooling layer may be understood as belonging to a first branch of the discriminator that is branched off of the intermediate representation. The global pooling operation advantageously collapses the information of the feature maps of intermediate representation into a vector, wherein each element of the vector characterizes the content of an entire feature map of the intermediate representation. Classifying the provided image based on the content representation thus judges the provided image based on the global contents of the different feature maps. As the feature maps characterize different high level objects in the image (e.g., appearance of objects in the image), determining a classification based on the content representation hence allows for classifying a global content of the provided image into either the first or second class.

The discriminator further determines the content representation by applying a convolutional operation to the intermediate representation. Preferably, the convolutional operation comprises a single filter for providing the layout representation. The layout representation may hence consist of a single feature map. Advantageously, this collapses the feature maps of the intermediate representation into a single feature map. Classifying the provided image based on the content representation thus judges the provided image based on the local consistency of the feature maps. The convolutional operation may be characterized by a convolutional layer comprised by the discriminator. The convolutional layer may be understood as belonging to a second branch of the discriminator that is branched off of the intermediate representation. Preferably, the convolutional operation is a 1×1-convolution, e.g., the convolutional layer comprises a single 1×1 convolution.

The content value may be obtained by providing the content representation to a second plurality of layers, wherein an output of the second plurality of layers is the content value. The layout value may be obtained by providing the layout representation to a third plurality of layers, wherein an output of the third plurality of layers is the layout value.

The first plurality of layers and/or the second plurality of layers and/or the third plurality of layers may preferably be organized in the form of neural network blocks. The first plurality of layers and/or second plurality of layers and/or the third plurality of layers may further be understood as sub-neural networks of the discriminator.

In a preferred embodiment of the present invention, any one of the neural network blocks of the discriminator, preferably each of the neural network blocks of the discriminator, is either a residual block or a dense block or a dense-shortcut block.

For training the machine learning system, a loss value may be determined after each branch of the discriminator according to the formula $$\mathcal{L}_* = \mathbb{E}_x[\log D_*(x)] + \mathbb{E}_z[\log(1-D_*(G(z)))],$$

wherein $D_*$ is a placeholder for either the discriminator output of the content branch $D_c$ (i.e., the content value) or the discriminator output $D_l$ of the layout branch (i.e., the layout value), x is the second image, z is the at least one randomly drawn value and G(z) is the output of the generator for the at least one random value, i.e., the first image. Determining a sum of a loss value obtained for the content branch and a loss value obtained for the layout branch may then be used for training the generator and/or the discriminator.

In a preferred embodiment of the present invention, the first plurality of layers and/or the second plurality of layers and/or the second plurality of layers are organized in the form of residual block, wherein after at least one residual block, preferably after each residual blocks, a loss value is determined, wherein the loss value characterizes a deviation of a classification of the second image into the second class and the first image into the first class, and the machine learning system is trained based on the loss value.

Preferably, a loss value is determined after each residual block and training the machine learning system comprises optimizing a sum of the determined loss values.

The inventors found that this may be advantageous as training the machine learning system according to the sum of loss values after each residual block allows the discriminator to evaluate the provided image at different scales. The discriminator hence learns to distinguish between the second image and the first image based on corresponding features obtained after each residual block, which captures either low-level details at different scales (for residual blocks for the first plurality of layers), content features at different scales (for residual blocks for the second plurality of layers) or layout features at different scales (for residual blocks for the third plurality of layers).

In a preferred embodiment of the present invention, the method further comprises the steps of:
 Generating the at least one image by means of the generator;
 Training and/or testing an image classifier based on the at least one generated image.

This is advantageous as the image classifier may be trained and/or tested with more data. In turn this increases the performance of the image classifier or the approximation of the generalization capabilities of the image classifier respectively.

Embodiments of the present invention will be further discussed with reference to the following figures in more detail.

DETAILED DESCRIPTION OF EXAMPLE EMBODIMENTS

Figure 1:
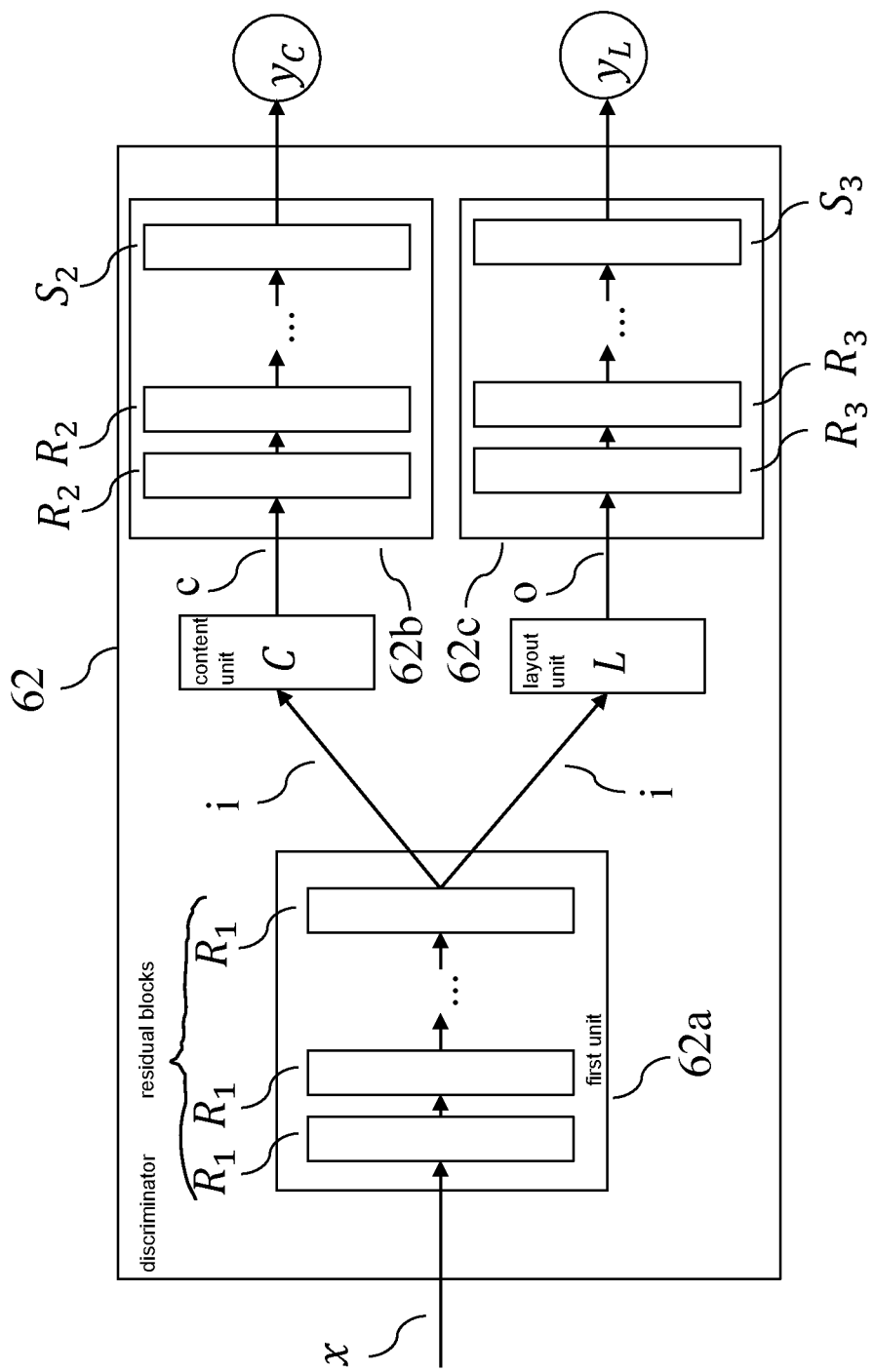
FIG. 1 shows a discriminator of a machine learning system, in accordance with an example embodiment of the present invention.

FIG. 1 shows a discriminator (62). The discriminator (62) accepts an image (x) as input. The image (x) is forwarded to a first unit (62a) of the discriminator (62). The first unit (62a) is configured to determine an intermediate representation (i) of the image (x). Preferably, the first unit (62a) comprises a first neural network for determining the intermediate representation (i). In a preferred embodiment, the first neural network comprises a plurality of residual blocks ($R_1$). A first residual block ($R_1$) of the first neural network accepts the image (x) as input. The other residual blocks ($R_1$) of the first neural network each accept the output of another residual block ($R_1$) of the first neural network as input. A last residual block ($R_1$) of the first neural network, i.e., a residual block ($R_1$) of the first neural network which does not further provide its output to another residual block ($R_1$) of the first neural network, then provides its output as intermediate representation (i). The intermediate representation (i) may hence comprise a plurality of feature maps characterizing the image (x).

The intermediate representation (i) is forwarded to a content unit (C) and a layout unit (L). The content unit (C) is configured to determine a content representation (c) based on the intermediate representation (i). In a preferred embodiment, the content unit (C) achieves this by applying a global pooling layer to the intermediate representation (i). The global pooling layer collapses the feature maps to a single value each. The output of the global pooling layer is hence a vector, wherein each component of the vector is the globally pooled value of a feature map of the intermediate representation (i). As pooling operation, conventional pooling operations such as max pooling, average pooling or stochastic pooling may be used. The output of the pooling operation may then be provided as the content representation (c).

The layout unit (L) is configured to determine a layout representation (o) based on the intermediate representation (i). In a preferred embodiment, the layout unit (L) achieves this by applying a 1×1 convolutional layer of a single filter to the intermediate representation (i). The convolutional layer hence determines a single feature map that has the same width and height as the feature maps in the intermediate representation (i). The single feature map may then be provided as layout representation (o). In further embodiments, it is also possible to use other filter sizes for the convolutional layer, e.g., 3×3, possibly applying padding, dilation or other conventional modifications to the convolution operation.

The content representation (c) is forwarded to a second unit (62b) of the discriminator (62). The second unit (62b) is configured to determine a content value ($y_c$) characterizing a classification of the image (x) based on the content representation (c). Preferably, the second unit (62b) comprises a second neural network for determining the content value ($y_c$). In a preferred embodiment, the second neural network comprises a plurality of residual blocks ($R_2$). A first residual block ($R_2$) of the second neural network accepts the intermediate representation (i) as input. The other residual blocks ($R_2$) of the second neural network each accept the output of another residual block ($R_2$) of the second neural network as input. A last residual block ($R_2$) of the second neural network then provides its output to a last layer ($S_2$) of the second neural network. The last layer ($S_2$) is preferably a fully connected layer configured to determine the content value ($y_c$) based on the output of the last residual block ($R_2$) of the second neural network.

The content representation (c) is also forwarded to a third unit (62c) of the discriminator (62). The third unit (62c) is configured to determine a layout value ($y_l$) characterizing a classification of the image (x) based on the layout representation (o). Preferably, the third unit (62c) comprises a third neural network for determining the layout value ($y_l$). In a preferred embodiment, the third neural network comprises a plurality of residual blocks ($R_3$). A first residual block ($R_3$) of the third neural network accepts the intermediate representation (i) as input. The other residual blocks ($R_3$) of the third neural network each accept the output of another residual block ($R_3$) of the third neural network as input. A last residual block ($R_3$) of the third neural network then provides its output to a last layer ($S_3$) of the third neural network. The last layer ($S_3$) may be a fully connected layer configured to determine the layout value ($y_l$) based on the output of the last residual block ($R_3$) of the third neural network. Preferably, the last layer ($S_3$) is a convolutional layer of a single filter, especially a 1×1 convolutional layer, wherein the convolutional layer then determines a plurality of layout values ($y_l$), preferably one layout value ($y_l$) for each pixel in the feature map.

In further embodiments, dense blocks or dense-shortcut blocks may be used instead of the residual blocks in the first unit (62a) and/or second unit (62b) and/or third unit (62c).

Figure 2:
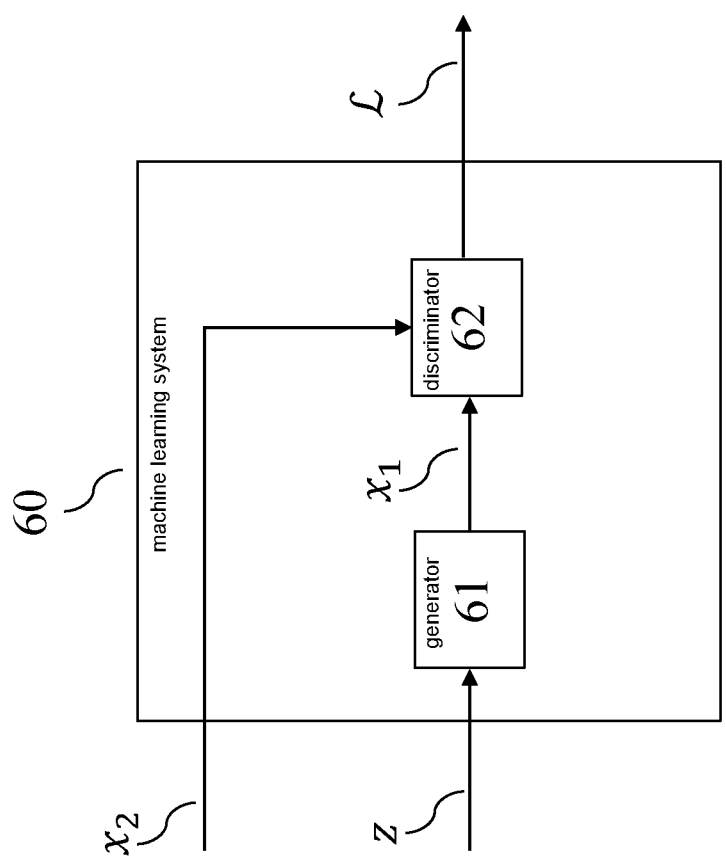
FIG. 2 shows the machine learning system, in accordance with an example embodiment of the present invention.

FIG. 2 shows an embodiment of a machine learning system (60). The machine learning system comprises the discriminator (62) as well as a generator (61). The generator (61) is configured to accept at least one randomly drawn value (z), preferably a plurality of randomly drawn values, and generate a first image ($x_1$) based on the at least one randomly drawn value (z). For this, the generator (61) may preferably comprise a convolutional neural network configured to accept the at least one randomly drawn value (z) and output the first image ($x_1$). The convolutional neural network is preferably made up of neural network blocks, e.g., residual blocks, dense blocks or dense-shortcut blocks.

The first image ($x_1$) and a provided second image ($x_2$) are then forwarded to the discriminator (62). The discriminator (62) then determines a content value ($y_c$) and at least one layout value ($y_l$) for each of the two images. For training the machine learning system (60), a loss value ($\mathcal{L}$) may then be determined according to the formula $$\mathcal{L} = \log y_c^{(2)} + \frac{1}{N}\sum \log y_l^{(2)} + \log(1 - y_c^{(1)}) + \frac{1}{N}\sum \log(1 - y_l^{(1)}),$$

wherein $y_c^{(1)}$ is the content value ($y_c$) determined for the first image ($x_1$), $y_l^{(1)}$ is the at least one layout value ($y_l$) determined for the first image ($x_1$), $y_c^{(2)}$ is the content value ($y_c$) determined for the second image ($x_2$), $y_l^{(2)}$ is the at least one layout value ($y_l$) determined for the second image ($x_2$) and N is the number of layout values ($y_l$) determined by the discriminator (62) for a supplied image.

In further preferred embodiments, an intermediate loss value is determined for each residual block ($R_1, R_2, R_3$) and for the last layer ($S_2$) of the second neural network as well as for the last layer ($S_3$) of the third neural network and the loss value ($\mathcal{L}$) for training the machine learning system (60) is determined according to a sum of the intermediate loss values. For this, the discriminator may comprise a 1×1 convolutional layer for each residual block ($R_1, R_2, R_3$) and each of the last layers ($S_2, S_3$), wherein each of the 1×1 convolutional layer corresponds with either a residual block ($R_1, R_2, R_3$) or a last layer ($S_2, S_3$). The intermediate loss value for a residual block ($R_1, R_2, R_3$) or for a last layer ($S_2, S_3$) may then be determined according to the formula $$\mathcal{L}_{D_*^l} = \frac{1}{N_{D_*^l}}\sum_{i=1}^{N_{D_*^l}} \log D_*^l(x_2) + \frac{1}{N_{D_*^l}}\sum_{i=1}^{N_{D_*^l}} \log(1 - D_*^l(x_1)),$$

wherein $N_{D*^l}$ is the number of elements determined from the 1×1 convolutional layer corresponding to the residual block ($R_1,R_2,R_3$) or the last layer ($S_2,S_3$), $D_*^l(x_1)$ is the output of the 1×1 convolutional layer for the first image ($x_1$) and $D_*^l(x_2)$ is the output of the 1×1 convolutional layer for the second image ($x_2$). For a given unit (62a, 62b, 62c) of the discriminator (62), the intermediate loss values may then be averaged to determine a loss value of the unit according to the formula $$\mathcal{L}_{D_*} = \frac{1}{N_*}\sum_{l=1}^{N_*} \mathcal{L}_{D_*^l},$$

wherein $N_*$ is the number of residual blocks ($R_1,R_2,R_3$) and last layers ($S_2,S_3$) in the unit, which is equivalent to the number of intermediate loss values determined for the unit (62a, 62b, 62c). The loss value ($\mathcal{L}$) for training the machine learning system (60) may then be a sum, preferably a weighted sum, of the loss values determined for the first unit (62a), the second unit (62b) and the third unit (62c). Preferably, the loss value ($\mathcal{L}$) for training the machine learning system (60) is determined according to the formula $$\mathcal{L} = 2 \cdot \mathcal{L}_{D_1} + \mathcal{L}_{D_2} + \mathcal{L}_{D_3},$$

wherein $\mathcal{L}_{D_1}$ is the loss value determined for the first unit (62a), $\mathcal{L}_{D_2}$ is the loss value determined for the second unit (62b) and $\mathcal{L}_{D_3}$ is the loss value determined for the third unit (62c).

Figure 3:
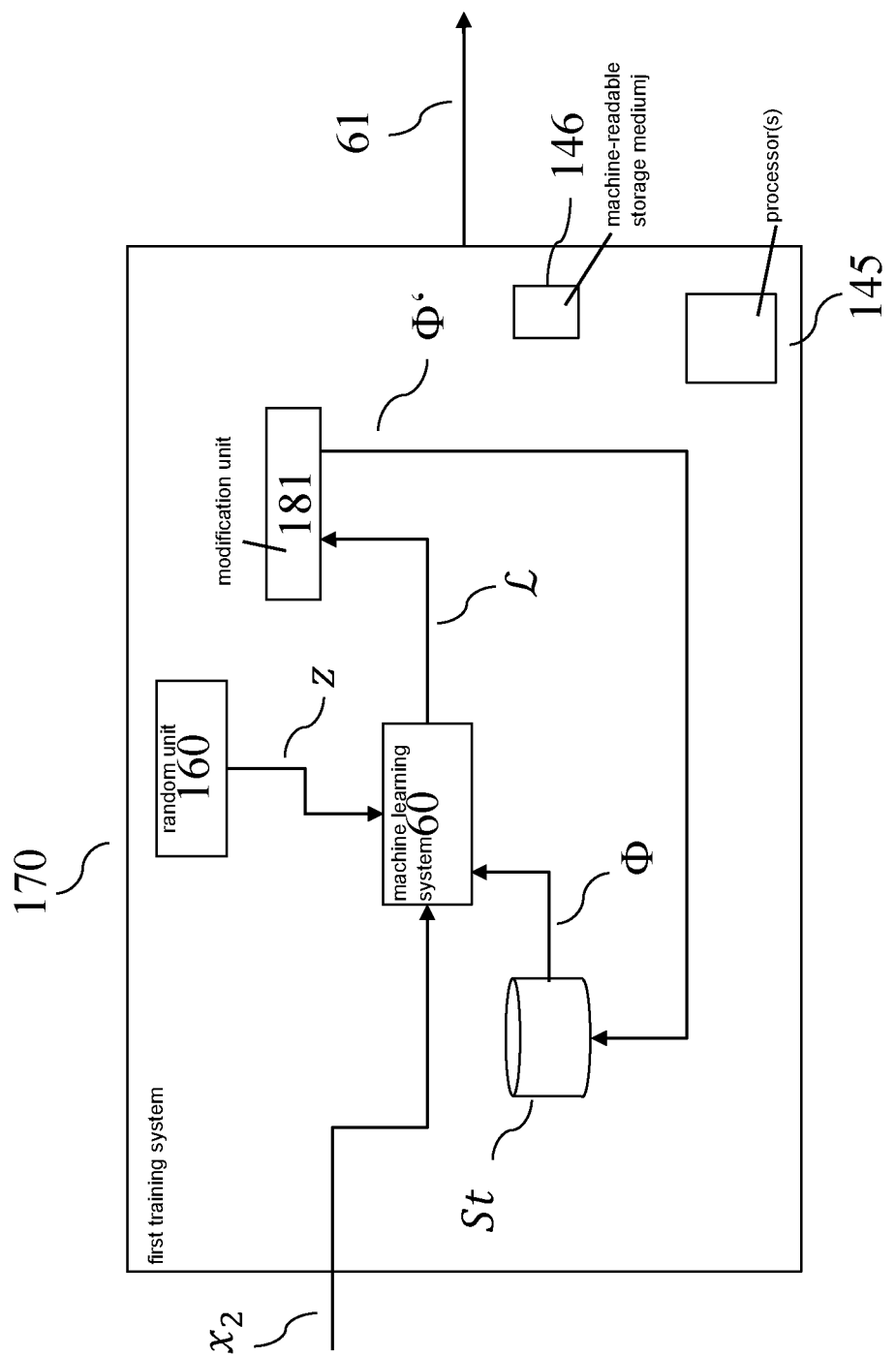
FIG. 3 shows a training system for training the machine learning system, in accordance with an example embodiment of the present invention.

FIG. 3 shows an embodiment of a first training system (170) for training the machine learning system (60). The first training system (170) receives the second image ($x_2$), for which the machine learning system (60) shall be trained. A random unit (160) determines the at least one random value (z) and the at least one random value (z) and the second image ($x_2$) are forwarded to the machine learning system (60). The machine learning system (60) then determines the loss value ($\mathcal{L}$), which is forwarded to a modification unit (181).

The modification unit (181) then determines new parameters ($\Phi'$) for the machine learning system (60) based on the loss value ($\mathcal{L}$), e.g., by gradient descent or an evolutionary algorithm. For the discriminator (62), the new parameters ($\Phi'$) are determined such that the loss value ($\mathcal{L}$) is minimized while the new parameters ($\Phi'$) of the generator (61) are determined such that the loss value ($\mathcal{L}$) is maximized. Preferably, this is done in consecutive steps, i.e., first determining new parameters ($\Phi'$) for the discriminator (62) and then determining new paramters ($\Phi'$) for the generator (61).

Preferably, for training the generator (61) the loss value ($\mathcal{L}$) is amended by another loss term and may be determined according to the formula:

$$\mathcal{L} = 2 \cdot \mathcal{L}_{D_1} + \mathcal{L}_{D_2} + \mathcal{L}_{D_3} + \frac{1}{L}\sum_{l=1}^{L} \|G^l(z_1) - G^l(z_2)\|,$$

wherein $G^l(\cdot)$ is the output of the l-th block of the generator, $z_1$ is an at least one first randomly drawn value, $z_2$ is an at least one second randomly value and L is the amount of blocks of the generator after which the loss function shall be applied.

In other preferred embodiments, the described training is repeated iteratively for a predefined number of iteration steps or repeated iteratively until the loss value falls below a predefined threshold value. Alternatively or additionally, it is also possible that the training is terminated when an average loss value with respect to a test or validation data set falls below a predefined threshold value. In at least one of the iterations the new parameters ($\Phi'$) determined in a previous iteration are used as parameters ($\Phi$) of the machine learning system (60).

In even further embodiments, the first training system (170) is provided with a plurality of second images ($x_2$). In each training iteration a second image ($x_2$) is chosen from the plurality, preferably at random, and used for training the machine learning system (60).

Furthermore, the first training system (170) may comprise at least one processor (145) and at least one machine-readable storage medium (146) containing instructions which, when executed by the processor (145), cause the training system (140) to execute a training method according to one of the aspects of the present invention.

After training, the generator (61) is provided from the first training system (170).

Figure 4:
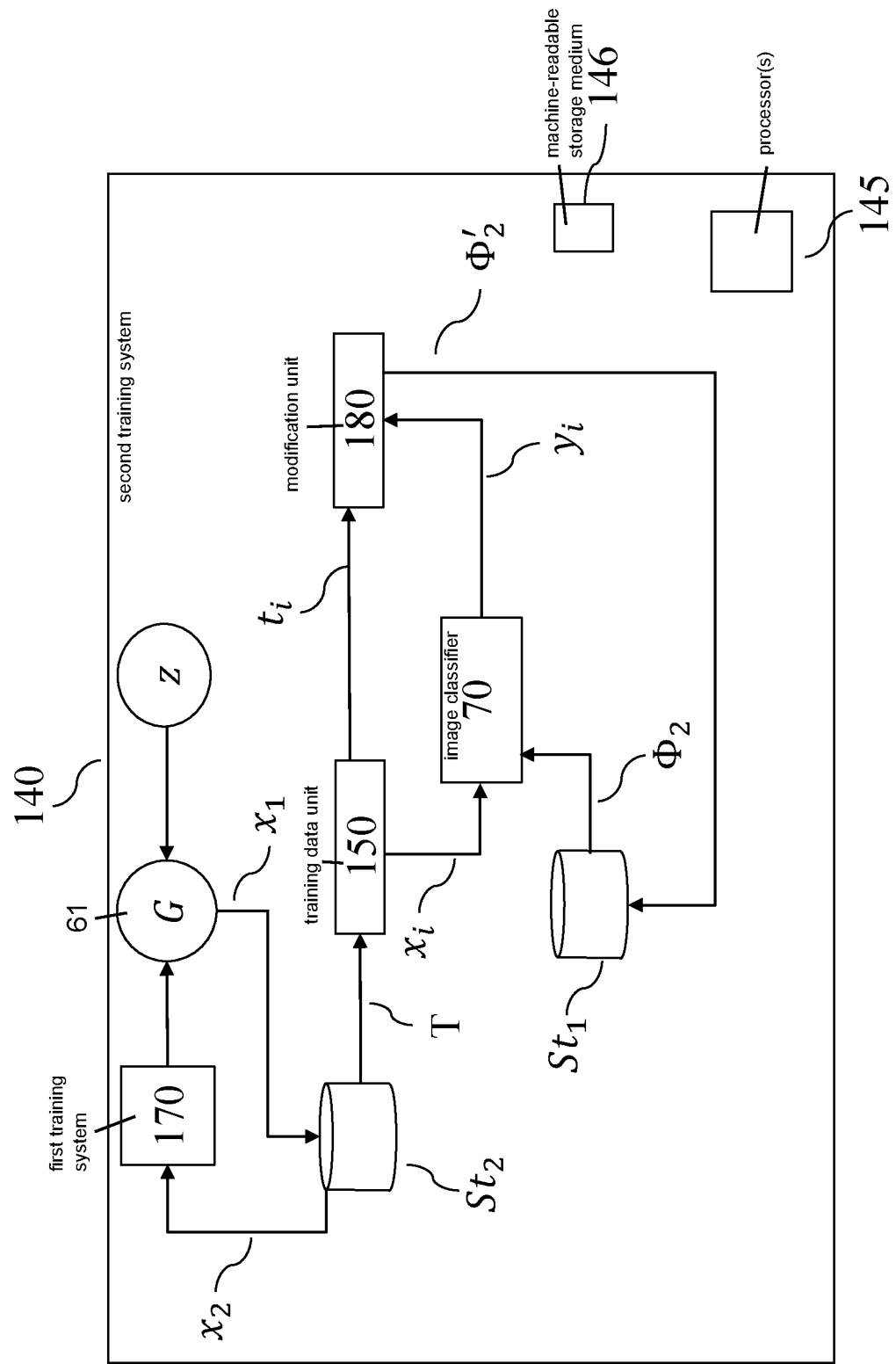
FIG. 4 shows a training system for training an image classifier based on a generator of the machine learning system, in accordance with an example embodiment of the present invention.

FIG. 4 shows an embodiment of a second training system (140) for training an image classifier (70) by means of a training data set (T). The training data set (T) comprises a plurality of input images ($x_i$) which are used for training the image classifier (70), wherein the training data set (T) further comprises, for each input image ($x_i$), a desired output signal ($t_i$) which characterizes a classification of the input signal ($x_i$).

Before training the image classifier (70), at least one input image ($x_i$) is provided as second image ($x_2$) to the first training system (170). The first training system (170) then determines the trained generator (61). The generator (61) then determines at least one first image ($x_1$) based on at least one randomly drawn value (z). The first image ($x_1$) is assigned the desired output signal ($t_i$) corresponding to the input image ($x_i$) provided as second image ($x_2$). The first image ($x_1$) is then provided as input image ($x_i$) in the training data set (T) thus increasing the amount of training data in the training data set (T).

For training the image classifier (70), a training data unit (150) accesses a computer-implemented database ($St_2$), the database ($St_2$) providing the training data set (T). The training data unit (150) determines from the training data set (T) preferably randomly at least one input signal ($x_i$) and the desired output signal ($t_i$) corresponding to the input signal ($x_i$) and transmits the input signal ($x_i$) to the image classifier (70). The image classifier (70) determines an output signal ($y_i$) based on the input signal ($x_i$).

The desired output signal ($t_i$) and the determined output signal ($y_i$) are transmitted to a modification unit (180).

Based on the desired output signal ($t_i$) and the determined output signal ($y_i$), the modification unit (180) then determines new parameters ($\Phi'_2$) for the image classifier (70). For this purpose, the modification unit (180) compares the desired output signal ($t_i$) and the determined output signal ($y_i$) using a loss function. The loss function determines a first loss value that characterizes how far the determined output signal ($y_i$) deviates from the desired output signal ($t_i$). In the given embodiment, a negative log-likehood function is used as the loss function. Other loss functions are also possible in alternative embodiments.

The modification unit (180) determines the new parameters ($\Phi'_2$) based on the first loss value. In the given embodiment, this is done using a gradient descent method, preferably stochastic gradient descent, Adam, or AdamW.

In other preferred embodiments, the described training is repeated iteratively for a predefined number of iteration steps or repeated iteratively until the first loss value falls below a predefined threshold value. Alternatively or additionally, it is also possible that the training is terminated when an average first loss value with respect to a test or validation data set falls below a predefined threshold value. In at least one of the iterations the new parameters ($\Phi'_2$) determined in a previous iteration are used as parameters ($\Phi_2$) of the image classifier (70).

Furthermore, the second training system (140) may comprise at least one processor (145) and at least one machine-readable storage medium (146) containing instructions which, when executed by the processor (145), cause the training system (140) to execute a training method according to one of the aspects of the present invention.

Figure 5:
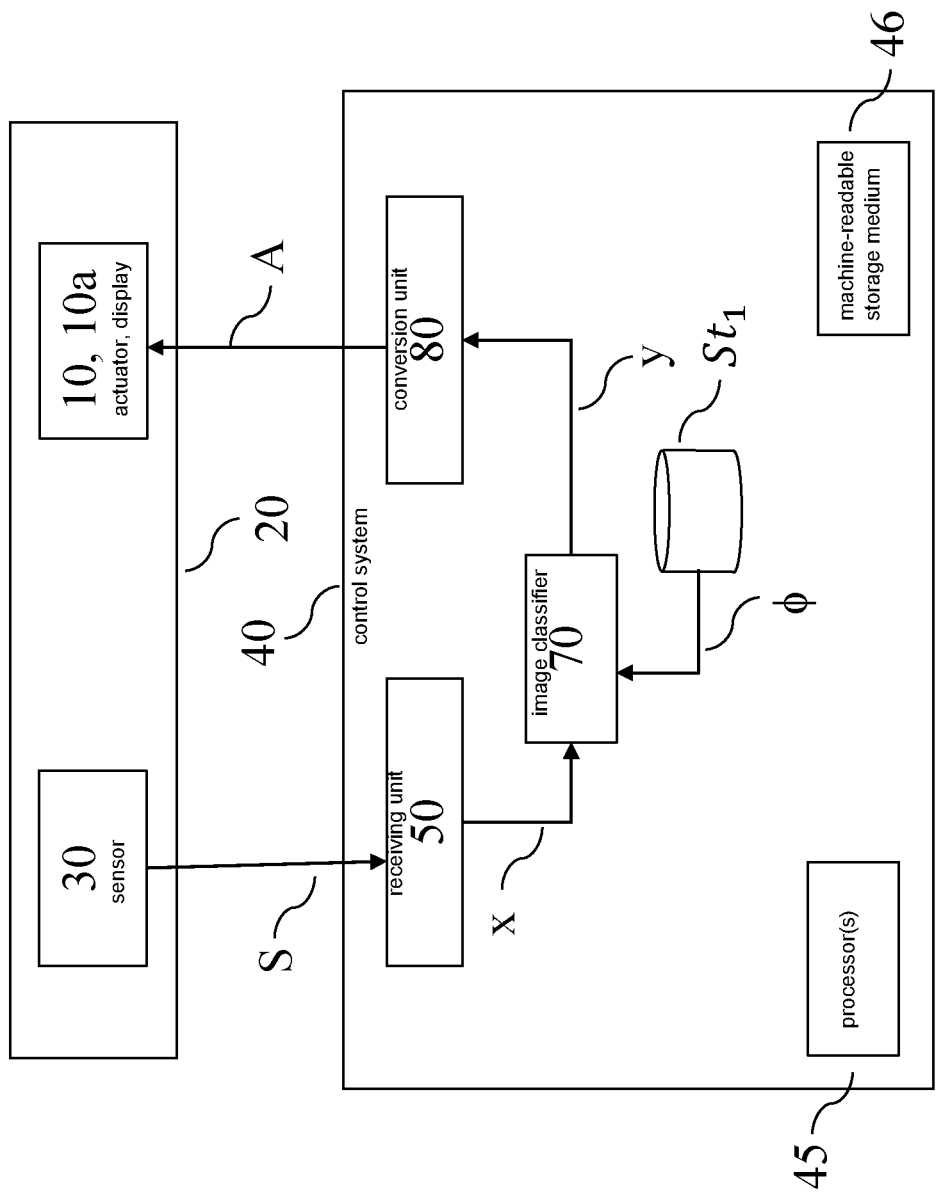
FIG. 5 shows a control system comprising the image classifier controlling an actuator in its environment, in accordance with an example embodiment of the present invention.

FIG. 5 shows an embodiment of an actuator (10) in its environment (20), wherein the actuator (10) is controlled based on the image classifier (70). The actuator (10) interacts with a control system (40). The actuator (10) and its environment (20) will be jointly called actuator system. At preferably evenly spaced points in time, a sensor (30) senses a condition of the actuator system. The sensor (30) may comprise several sensors. Preferably, the sensor (30) is an optical sensor that takes images of the environment (20). An output signal (S) of the sensor (30) (or, in case the sensor (30) comprises a plurality of sensors, an output signal (S) for each of the sensors) which encodes the sensed condition is transmitted to the control system (40).

Thereby, the control system (40) receives a stream of sensor signals (S). It then computes a series of control signals (A) depending on the stream of sensor signals (S), which are then transmitted to the actuator (10).

The control system (40) receives the stream of sensor signals (S) of the sensor (30) in an optional receiving unit (50). The receiving unit (50) transforms the sensor signals (S) into input images (x). Alternatively, in case of no receiving unit (50), each sensor signal (S) may directly be taken as an input image (x). The input image (x) may, for example, be given as an excerpt from the sensor signal (S). Alternatively, the sensor signal (S) may be processed to yield the input image (x). In other words, the input image (x) is provided in accordance with the sensor signal (S).

The input image (x) is then passed on to the image classifier (70).

The classifier (60) is parametrized by parameters ($\varphi$), which are stored in and provided by a parameter storage ($St_1$).

The image classifier (70) determines an output signal (y) from the input image (x). The output signal (y) comprises information that assigns one or more labels to the input signal (x). The output signal (y) is transmitted to an optional conversion unit (80), which converts the output signal (y) into the control signals (A). The control signals (A) are then transmitted to the actuator (10) for controlling the actuator (10) accordingly. Alternatively, the output signal (y) may directly be taken as control signal (A).

The actuator (10) receives control signals (A), is controlled accordingly and carries out an action corresponding to the control signal (A). The actuator (10) may comprise a control logic which transforms the control signal (A) into a further control signal, which is then used to control actuator (10).

In further embodiments, the control system (40) may comprise the sensor (30). In even further embodiments, the control system (40) alternatively or additionally may comprise an actuator (10).

In still further embodiments, it can be envisioned that the control system (40) controls a display (10a) instead of or in addition to the actuator (10).

Furthermore, the control system (40) may comprise at least one processor (45) and at least one machine-readable storage medium (46) on which instructions are stored which, if carried out, cause the control system (40) to carry out a method according to an aspect of the present invention.

Figure 6:
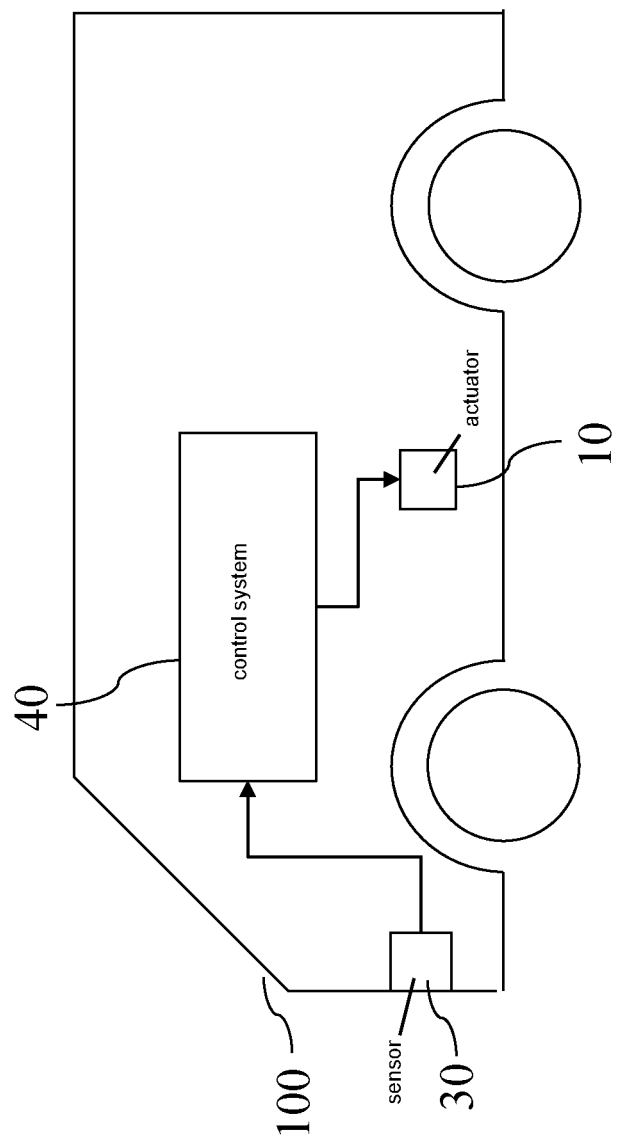
FIG. 6 shows the control system controlling an at least partially autonomous robot, in accordance with an example embodiment of the present invention.

FIG. 6 shows an embodiment in which the control system (40) is used to control an at least partially autonomous robot, e.g., an at least partially autonomous vehicle (100).

The sensor (30) may comprise one or more video sensors and/or one or more radar sensors and/or one or more ultrasonic sensors and/or one or more LiDAR sensors. Some or all of these sensors are preferably but not necessarily integrated in the vehicle (100).

The image classifier (70) may be configured to classify whether the environment characterized by the input image (x) is feasible for an at least partially automated operation of the vehicle (100). The classification may, for example, determine whether or not the vehicle (100) is located on a highway. The control signal (A) may then be determined in accordance with this information. In case it is located on a highway, the actuator (10) may be operated at least partially automatically and may only be operated by an operator and/or driver of the vehicle (100) otherwise.

The actuator (10), which is preferably integrated in the vehicle (100), may be given by a brake, a propulsion system, an engine, a drivetrain, or a steering of the vehicle (100).

Alternatively or additionally, the control signal (A) may also be used to control the display (10a), e.g., for displaying the classification result obtained by the image classifier (70). It is also possible that the control signal (A) may control the display (10a) such that it produces a warning signal, if the vehicle (100) is not in a feasible environment and the operator and/or driver tries to activate an at least partial automated operation of the vehicle (100). The warning signal may be a warning sound and/or a haptic signal, e.g., a vibration of a steering wheel of the vehicle.

In further embodiments, the at least partially autonomous robot may be given by another mobile robot (not shown), which may, for example, move by flying, swimming, diving or stepping. The mobile robot may, inter alia, be an at least partially autonomous lawn mower, or an at least partially autonomous cleaning robot. In all of the above embodiments, the control signal (A) may be determined such that propulsion unit and/or steering and/or brake of the mobile robot are controlled accordingly.

In a further embodiment, the at least partially autonomous robot may be given by a gardening robot (not shown), which uses the sensor (30), preferably an optical sensor, to determine a state of plants in the environment (20). The actuator (10) may control a nozzle for spraying liquids and/or a cutting device, e.g., a blade. Depending on an identified species and/or an identified state of the plants, a control signal (A) may be determined to cause the actuator (10) to spray the plants with a suitable quantity of suitable liquids and/or cut the plants.

In even further embodiments, the at least partially autonomous robot may be given by a domestic appliance (not shown), like e.g. a washing machine, a stove, an oven, a microwave, or a dishwasher. The sensor (30), e.g., an optical sensor, may detect a state of an object which is to undergo processing by the household appliance. For example, in the case of the domestic appliance being a washing machine, the sensor (30) may detect a state of the laundry inside the washing machine. The control signal (A) may then be determined depending on a detected material of the laundry.

Figure 7:
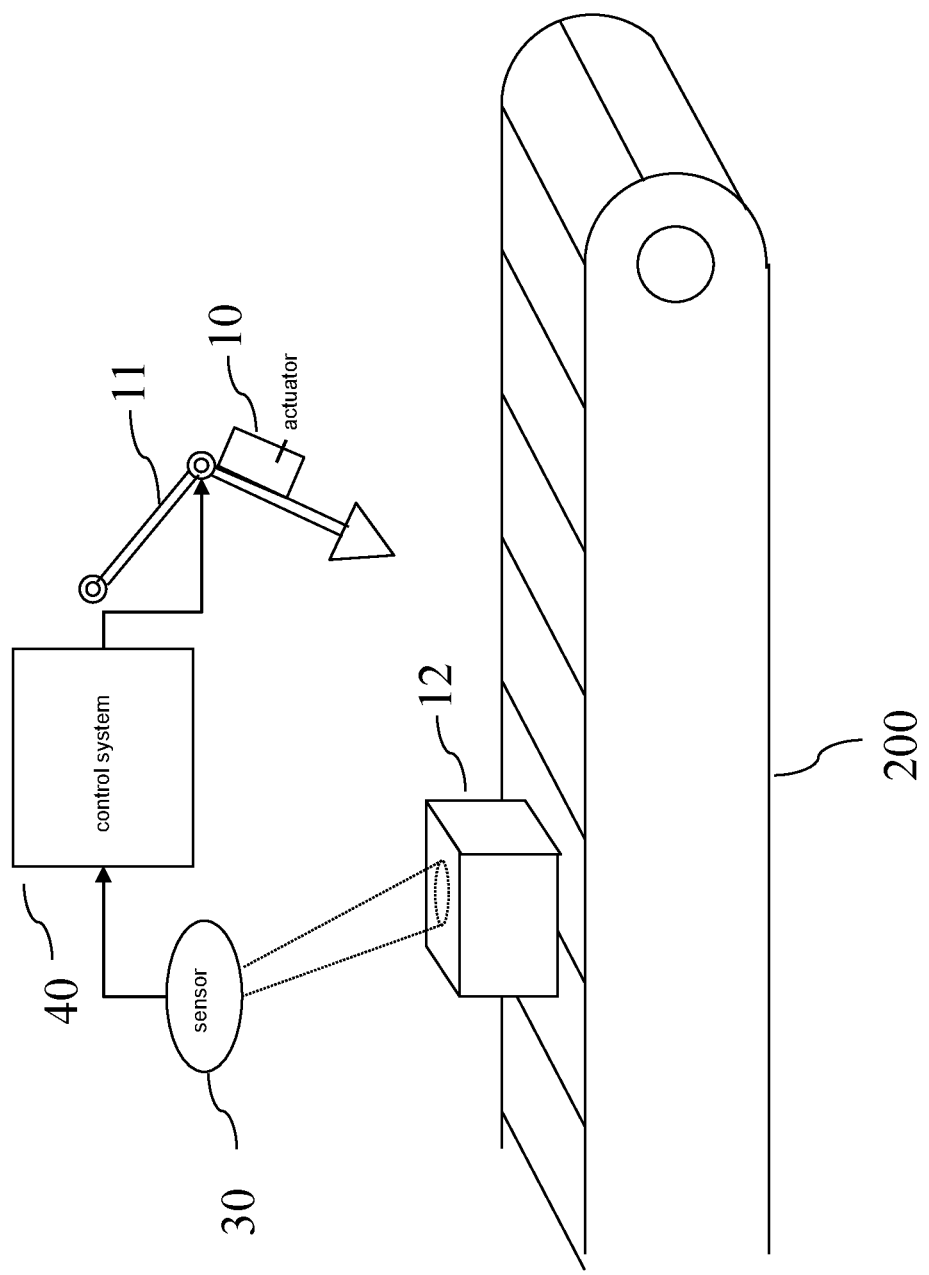
FIG. 7 shows the control system controlling a manufacturing machine, in accordance with an example embodiment of the present invention.

FIG. 7 shows an embodiment in which the control system (40) is used to control a manufacturing machine (11), e.g., a punch cutter, a cutter, a gun drill or a gripper, of a manufacturing system (200), e.g., as part of a production line. The manufacturing machine may comprise a transportation device, e.g., a conveyer belt or an assembly line, which moves a manufactured product (12). The control system (40) controls an actuator (10), which in turn controls the manufacturing machine (11).

The sensor (30) may be given by an optical sensor which captures properties of, e.g., a manufactured product (12).

The image classifier (60) may determine a classification of the manufactured product (12), e.g., whether the manufactured product is broken or exhibits a defect. The actuator (10) may then be controlled as to remove the manufactured product (12) from the transportation device.

The term "computer" may be understood as covering any devices for the processing of pre-defined calculation rules. These calculation rules can be in the form of software, hardware or a mixture of software and hardware.

In general, a plurality can be understood to be indexed, that is, each element of the plurality is assigned a unique index, preferably by assigning consecutive integers to the elements contained in the plurality. Preferably, if a plurality comprises N elements, wherein N is the number of elements in the plurality, the elements are assigned the integers from 1 to N.

It may also be understood that elements of the plurality can be accessed by their index.

What is claimed is:

1. A computer-implemented method for training a generative adversarial network, wherein a generator of the generative adversarial network is configured to generate at least one image based on at least one input value, the method comprising:
    training the generative adversarial network by maximizing a loss function that characterizes a difference between a first image determined by the generator for at least one first input value and a third image that is in addition to a provided second image, the third image being determined by the generator for at least one second input value;
    determining, by a discriminator of the generative adversarial network, a first output characterizing two classifications of the first image, and determining, by the discriminator, a second output characterizing two classifications of the provided second image, wherein the discriminator is configured to determine an output for a supplied image according to the following steps:
    determining an intermediate representation of the supplied image;
    determining a content representation of the supplied image by applying a global pooling operation to the intermediate representation;
    determining a layout representation of the supplied image by applying a convolutional operation to the intermediate representation;
    determining a content value characterizing a classification of the content representation and a layout value characterizing a classification of the layout representation and providing the content value and layout value in the output for the supplied image;
    training the discriminator such that the content value and layout value in the first output characterize a classification into a first class and such that the content value and layout value in the second output characterize a classification into a second class; and
    training the generator such that the content value and layout value in the first output characterize a classification into the second class.

2. The method according to claim 1, wherein the generator is a neural network including a plurality of neural network blocks.

3. The method according to claim 2, wherein the loss function is characterized by the formula:

$$\mathcal{L}_{DR}(G) = \frac{1}{L}\sum_{l=1}^{L}\|G^l(z_1) - G^l(z_2)\|,$$

wherein $G^l(\cdot)$ is an output of an l-th block of the generator, $z_1$ is the at least one first input value $z_2$ is the at least one second input value.

4. The method according to claim 1, wherein the convolutional operation is based on a single filter.

5. The method according to claim 1, wherein the intermediate representation is determined based on the supplied image using at least one first neural network block, and/or the content value is determined based on the content representation by using at least one second neural network block, and/or the layout value is determined based on the layout representation using at least one third neural network block.

6. The method according to claim 1, wherein the intermediate representation is determined based on the supplied image using a plurality of first neural network blocks, and/or the content value is determined based on the content representation by using a plurality of second neural network blocks and/or the layout value is determined based on the layout representation using a plurality of third neural network blocks.

7. The method according to claim 5, wherein after each neural network block, a loss value is determined, wherein the loss value characterizes a deviation of a classifications of the second image into the second class and the first image into the first class, and the generative adversarial network is trained based on the loss value.

8. The method according to claim 7, wherein for each neural network block of a plurality of neural network blocks, a loss value is determined and the training of the generative adversarial network includes optimizing a sum of the determined loss values.

9. The method according to claim 7, wherein a first loss value is determined for the at least one first neural network block and a second loss value is determined for the at least one second neural network block and a third loss value is determined for the at least one third neural network block and the training includes optimizing a weighted sum of the first loss value, the second loss value, and the third loss value.

10. The method according to claim 5, wherein each of the at least one first neural network block, and/or the at least one second neural network block, and/or the at least one third neural network block is either a residual block or a dense block or a dense-shortcut block.

11. The method according to claim 1, further comprising the following steps:
    generating at least one image using the generator; and
    training and/or testing an image classifier based on the at least one generated image.

12. A generative adversarial network including a generator configured to generate at least one image based on at least one input value, the generative adversarial network being trained by maximizing a loss function that characterizes a difference between a first image determined by the generator for at least one first input value and a third image that is in addition to a provided second image, the third image being determined by the generator for at least one second input value, the training of the adversarial network further comprising:
  determining, by a discriminator of the generative adversarial network, a first output characterizing two classifications of the first image, and determining, by the discriminator, a second output characterizing two classifications of the provided second image, wherein the discriminator is configured to determine an output for a supplied image by:
    determining an intermediate representation of the supplied image;
    determining a content representation of the supplied image by applying a global pooling operation to the intermediate representation;
    determining a layout representation of the supplied image by applying a convolutional operation to the intermediate representation;
    determining a content value characterizing a classification of the content representation and a layout value characterizing a classification of the layout representation and providing the content value and layout value in the output for the supplied image;
  training the discriminator such that the content value and layout value in the first output characterize a classification into a first class and such that the content value and layout value in the second output characterize a classification into a second class; and
  training the generator such that the content value and layout value in the first output characterize a classification into the second class.

13. A training system configured to training a generative adversarial network, wherein a generator of the generative adversarial network is configured to generate at least one image based on at least one input value, the training system configured to:
  train the generative adversarial network by maximizing a loss function that characterizes a difference between a first image determined by the generator for at least one first input value and a third image that is in addition to a provided second image, the third image being determined by the generator for at least one second input value;
  determining, by a discriminator of the generative adversarial network, a first output characterizing two classifications of the first image, and determining, by the discriminator, a second output characterizing two classifications of the provided second image, wherein the discriminator is configured to determine an output for a supplied image according to the following steps:
    determining an intermediate representation of the supplied image;
    determining a content representation of the supplied image by applying a global pooling operation to the intermediate representation;
    determining a layout representation of the supplied image by applying a convolutional operation to the intermediate representation;
    determining a content value characterizing a classification of the content representation and a layout value characterizing a classification of the layout representation and providing the content value and layout value in the output for the supplied image;
  training the discriminator such that the content value and layout value in the first output characterize a classification into a first class and such that the content value and layout value in the second output characterize a classification into a second class; and
  training the generator such that the content value and layout value in the first output characterize a classification into the second class.

14. A non-transitory machine-readable storage medium on which is stored a computer program for training a generative adversarial network, wherein a generator of the generative adversarial network is configured to generate at least one image based on at least one input value, the computer program, when executed by a processor, causing the processor to perform:
  training the generative adversarial network by maximizing a loss function that characterizes a difference between a first image determined by the generator for at least one first input value and a third image that is in addition to a provided second image, the third image being determined by the generator for at least one second input value;
  determining, by a discriminator of the generative adversarial network, a first output characterizing two classifications of the first image, and determining, by the discriminator, a second output characterizing two classifications of the provided second image, wherein the discriminator is configured to determine an output for a supplied image according to the following steps:
    determining an intermediate representation of the supplied image;
    determining a content representation of the supplied image by applying a global pooling operation to the intermediate representation;
    determining a layout representation of the supplied image by applying a convolutional operation to the intermediate representation;
    determining a content value characterizing a classification of the content representation and a layout value characterizing a classification of the layout representation and providing the content value and layout value in the output for the supplied image;
  training the discriminator such that the content value and layout value in the first output characterize a classification into a first class and such that the content value and layout value in the second output characterize a classification into a second class; and
  training the generator such that the content value and layout value in the first output characterize a classification into the second class.

\* \* \* \* \*